(12) United States Patent
Furukawa et al.

(10) Patent No.: US 7,021,595 B2
(45) Date of Patent: Apr. 4, 2006

(54) SLIDE RAIL

(75) Inventors: Osamu Furukawa, Chigasaki (JP); Yuuichi Ayuha, Chigasaki (JP); Toshiharu Endou, Chigasaki (JP)

(73) Assignee: Autech Japan, Inc., Kanagawa (JP)

( * ) Notice: Subject to any disclaimer, the term of this patent is extended or adjusted under 35 U.S.C. 154(b) by 0 days.

(21) Appl. No.: 10/723,262

(22) Filed: Nov. 25, 2003

(65) Prior Publication Data
US 2004/0188585 A1    Sep. 30, 2004

(30) Foreign Application Priority Data
Mar. 28, 2003 (JP) .............................. 2003-090071

(51) Int. Cl.
*F16M 13/00* (2006.01)
(52) U.S. Cl. ..................... 248/429; 297/341; 297/344.1
(58) Field of Classification Search ................ 248/424, 248/429, 430, 425; 297/341, 344.1
See application file for complete search history.

(56) References Cited

U.S. PATENT DOCUMENTS

| | | | | |
|---|---|---|---|---|
| 3,252,545 A | * | 5/1966 | Quayle | .................... 187/229 |
| 3,718,263 A | * | 2/1973 | Strecke | ....................... 212/333 |
| 5,328,321 A | * | 7/1994 | Moffett et al. | ............... 414/631 |
| 5,902,013 A | * | 5/1999 | Hong | .......................... 297/383 |
| 6,131,871 A | * | 10/2000 | Bernhardt et al. | .......... 248/424 |
| 2004/0188585 A1 | * | 9/2004 | Furukawa et al. | .......... 248/429 |

FOREIGN PATENT DOCUMENTS

JP          2001-1811         1/2001

* cited by examiner

*Primary Examiner*—Anita King
*Assistant Examiner*—Tan Le
(74) *Attorney, Agent, or Firm*—Jordan and Hamburg LLP

(57) ABSTRACT

A slide rail has a pair of inside rails in which V-grooves having a V shape in cross section are formed in a lengthwise direction in outside faces of the pair of inside rails which have inside faces provided so as to face each other. V-grooves are formed in inside faces of a pair of outside rails provided outside of both the inside rails, and the outside rails are moved relative to the inside rails by spherical bodies provided between both the V-grooves. A stay has ends which are supported on the inside faces of both the inside rails substantially opposing the V-grooves of the inside rails, and the stay is provided with a regulation mechanism for adjusting and maintaining a distance between both the inside rails.

12 Claims, 7 Drawing Sheets

SLIDE RAIL

BACKGROUND OF THE INVENTION

1. Field of the Invention

The present invention relates to a slide rail for sliding a seat.

2. Description of the Related Art

Conventionally, a driving unit for moving a seat 801 between the outside and inside of a cabin as shown in FIG. 5 has been known (for example, see Japanese Patent Laid-Open No. 2001-001811).

This driving unit is provided with a slide mechanism 811 on a rotation mechanism, and is configured so as to be capable of moving the seat 801 to the outside of the cabin after turning the seat 801 to the door side.

The slide mechanism 811 comprises a pair of inner rails 821, 821 fixed to the rotation mechanism, a pair of center rails 822, 822 provided on the outside of both the inner rails 821, 821, and a pair of outer rails 823, 823 provided on the outside of the center rails 822, 822. The seat 801 is fixed to an outer bracket 824 that is provided on the outer rails 823, 823 in a bridge-like form.

As shown in FIG. 6, in an outside face 831 of the inner rail 821, 821, a V-groove 832 having a V shape in cross section is formed, and the V-groove 832 houses steel balls 834, ... held by a holding element 833. As shown in FIG. 7, in an inside face 835 of the center rail 822, which faces the outside face 831 of the inner rail 821, 821, a V-groove 832 is formed. Between the V-grooves 832, 832 in both the rails 821 and 822, the steel balls 834 are held so as to be movable.

Also, V-grooves 832 are formed in the outside face 841 of the center rail 822 and in the inside face 842 of the outer rail 823 as well, and steel balls 834 held by a holding element 833 are held between both the V-grooves 832, 832 so as to be movable. Thereby, each of the rails 821 to 823 are configured so as to be capable of moving in the lengthwise direction and capable of sliding the seat 801 forward and backward by the operation of the driving unit, not shown.

In such a slide rail, however, though a bracket 851 is fixed to the upper faces of the inner rails 821 with screws, there is provided no construction for keeping the distance between the facing inner rails 821, 821 in the tip end portion thereof.

Therefore, as shown in FIG. 7, a load g on the seat 801 is applied to the center rail 822, a force f directed to the slantwise inside is applied to the inner rail 821 via the steel balls 834. Thereby, deflection t toward the inside is produced on the inner rail 821, so that the seat 801 supported on the outer rails 823 shifts transversely.

SUMMARY OF THE INVENTION

The present invention has been achieved in view of the above conventional problems, and accordingly an object thereof is to provide a slide rail capable of preventing troubles caused by a transverse shift.

To solve the above problem, the present invention provides a slide rail in which V-grooves having a V shape in cross section are formed in a lengthwise direction in the outside faces of a pair of inside rails provided so as to face each other and in the inside faces of a pair of outside rails provided on the outside of both the inside rails, and the outside rails are moved relative to the inside rails by spherical bodies provided between both the V-grooves, wherein there is provided a stay both ends of which are supported on the inside faces of the both inside rails, and the stay is provided with a regulation mechanism for regulating and maintaining a distance between both the inside rails.

That is, if a load is applied to the outside rails provided on the outside of the inside rails, a force is applied to the inside rails via the spherical bodies and the V-groove in the direction such that the inside rails are deflected toward the inside. However, the stay both ends of which are supported on the inside faces of the inside rails is provided between both the inside rails. Therefore, the deflection of both the inside rails toward the inside can be prevented.

Also, the stay is provided with the regulation mechanism for regulating and maintaining the distance between both the inside rails. Therefore, by regulating the distance between both the inside rails in advance, a pre-load on the spherical bodies held between the V-grooves can be regulated.

In the slide rail in accordance with the present invention as set forth above, there is provided a sprocket for a chain for driving the outside rail on the inside face of the inside rail, and the stay is supported on the inside rails via a sprocket shaft which supports the sprocket on the inside rail.

Thereby, the sprocket shafts provided to drive the outside rails can be utilized effectively. Also, the pressure exerted on the stay and the surface of the inside rail can be reduced.

A tip end of the sprocket shaft is supported on the inside face of the facing inside rail via the stay.

DETAILED DESCRIPTION OF THE PREFERRED EMBODIMENTS

Figure 1:
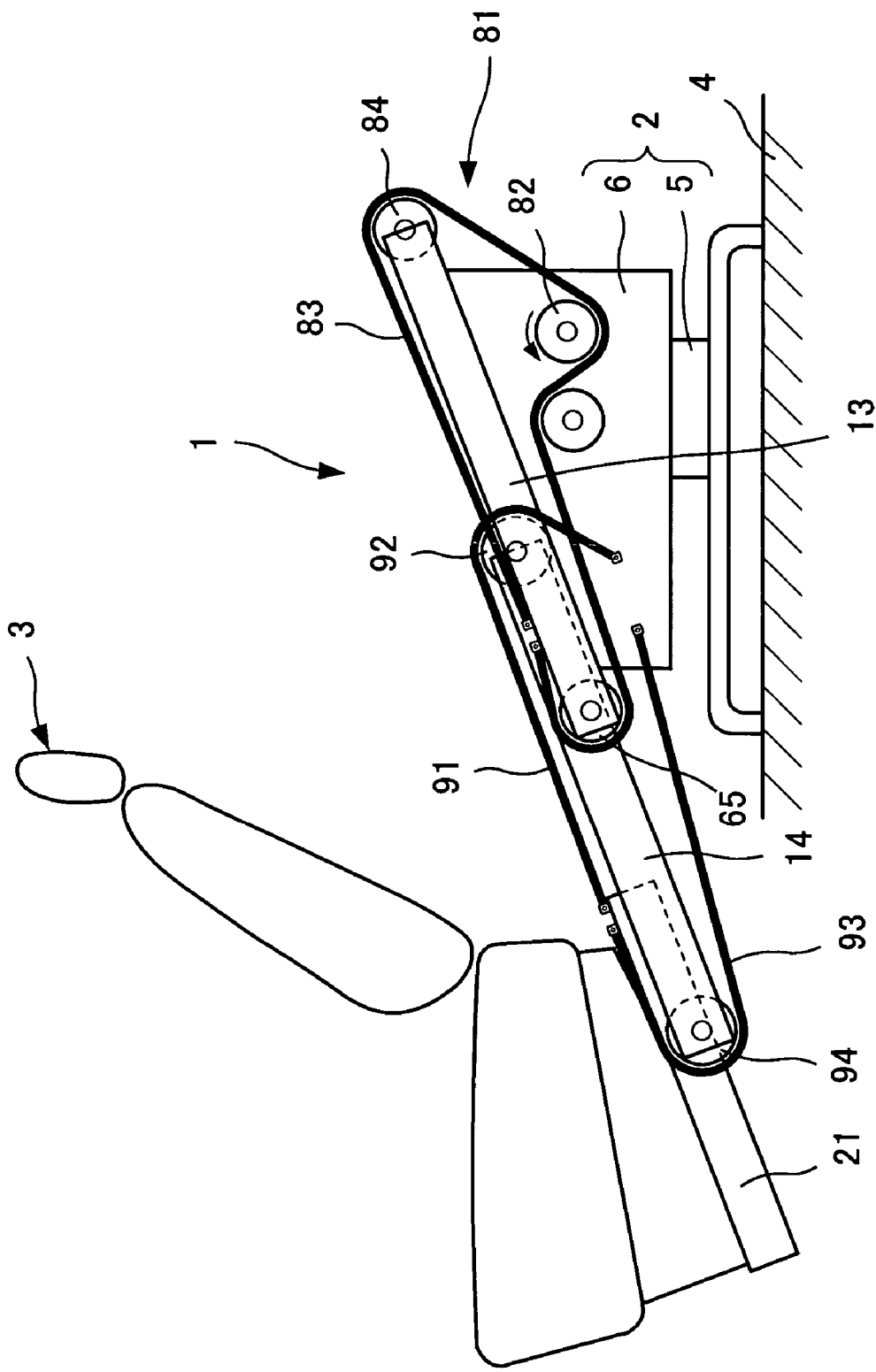
FIG. 1 is a side view showing one embodiment of the present invention.

An embodiment of the present invention will now be described with reference to the accompanying drawings. FIG. 1 is a view of a seat driving unit 2 provided with a slide rail 1 in accordance with this embodiment. The seat driving unit 2 is a device for assisting a passenger in getting on and off by moving a seat 3 provided in a vehicle between the inside and outside of a cabin. The seat driving unit 2 consists of a rotation mechanism 5 fixed to a vehicle body floor 4 and a slide mechanism 6 provided on the rotation mechanism 5, and is configured so that the seat 3 forwardly placed can be turned to the door opening side and then be moved to the outside of the cabin.

Figure 2:
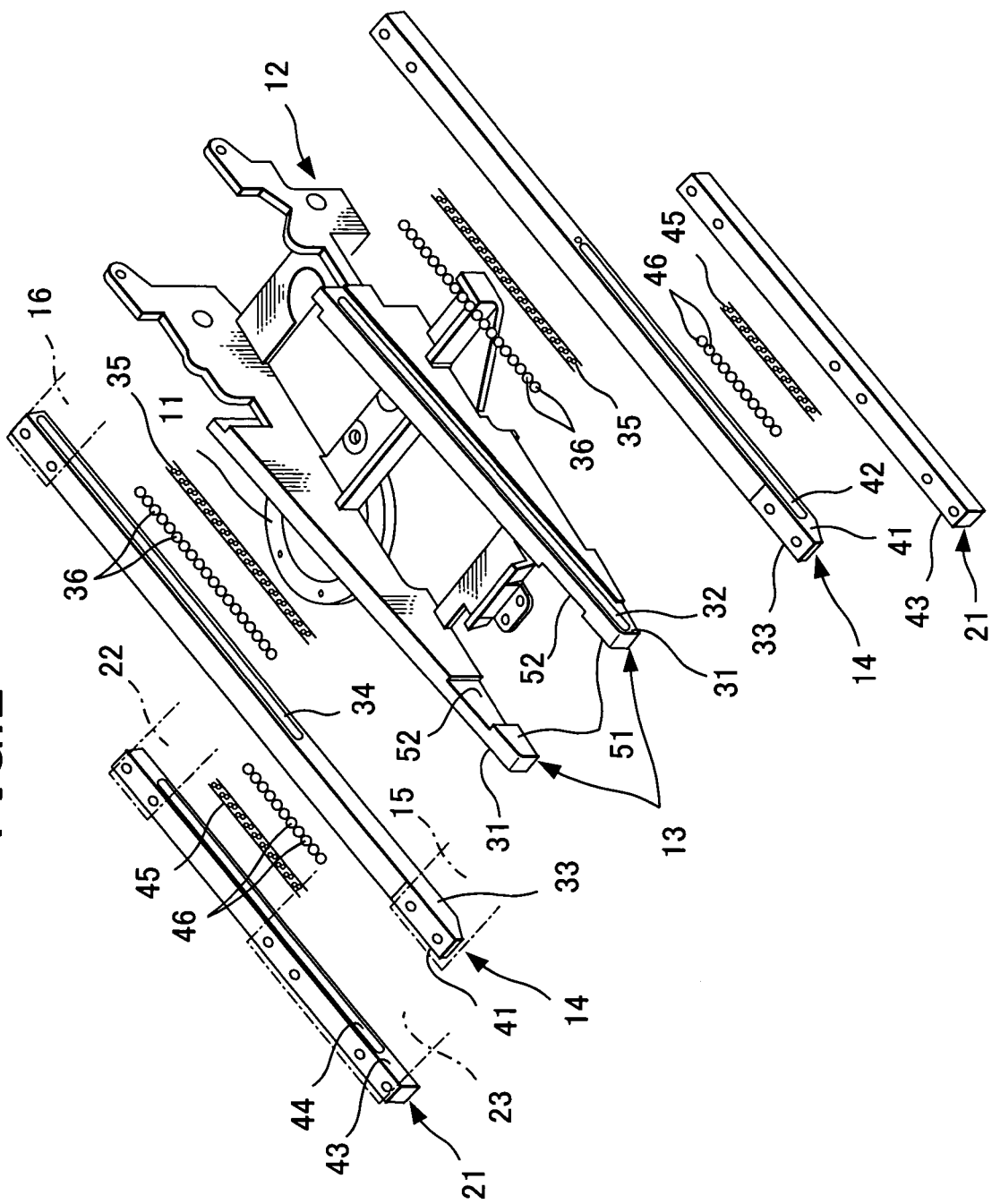
FIG. 2 is an exploded perspective view showing the embodiment shown in FIG. 1.

That is, as shown in FIG. 2, a rotating shaft 11 of the rotation mechanism 5 supports a swivel upper 12. The swivel upper 12 is formed with a pair of inner rails 13, 13 forming inside rails provided spacedly in parallel. On the outside of each of the inner rails 13, 13, a pair of center rails 14, 14 forming outside rails are provided. On the upper faces at the front and rear end portions of both the center rails 14, 14, plate-shaped brackets 15 and 16 are bolted in a bridge-like form, respectively. Thereby, both of the center rails 14, 14 are connected to each other.

On the outside of the center rails 14, 14, a pair of outer rails 21, 21 are arranged. On the upper faces at the rear end portions of both the outer rails 21, 21 as well, a plate-shaped bracket 22 is bolted in a bridge-like form, whereby both the outer rails 21, 21 are connected to each other. Also, on the upper faces at the front end portions of both the outer rails 21, 21, a wide fixing bracket 23 is bolted in a bridge-like form, and both the outer rails 21, 21 are connected to each other by this fixing bracket 23, and also the seat 3 is fixed on the fixing bracket 23 as shown in FIG. 1.

As shown in FIG. 2, in an outside face 31, 31 of each of the inner rails 13, 13, a V-groove 32 (only one side is shown in the figure) having a V shape in cross section as in the conventional example is formed longitudinally. Also, in inside faces 33, 33 of the center rails 14, 14, which face the V-groove 32, a V-groove 34 (only one side is shown in the figure) having a V shape is formed longitudinally. In a space formed by both the V-grooves 32, 32, 34, 34, steel balls 36, . . . serving as spherical bodies that are positioned in holes in a holding element 35 are housed so as to be movable. Thereby, the center rails 14, 14 are supported so as to be movable in the lengthwise direction with respect to the inner rails 13, 13.

In outside faces 41, 41 of each of the center rails 14, 14, a V-groove 42 (only one side is shown in the figure) having a V shape in cross section that is the same as described above is formed longitudinally. Also, in inside faces 43, 43 of the outer rails 21, 21 which face the V-groove 42, a V-groove 44 (only one side is shown in the figure) having a V shape is formed longitudinally. In a space formed by both the V-grooves 42, 44, steel balls 46, . . . serving as spherical bodies that are positioned in holes in a holding element 45 are housed so as to be movable. Thereby, the outer rails 21, 21 are supported so as to be movable in the lengthwise direction with respect to the center rails 14, 14.

Figure 3:
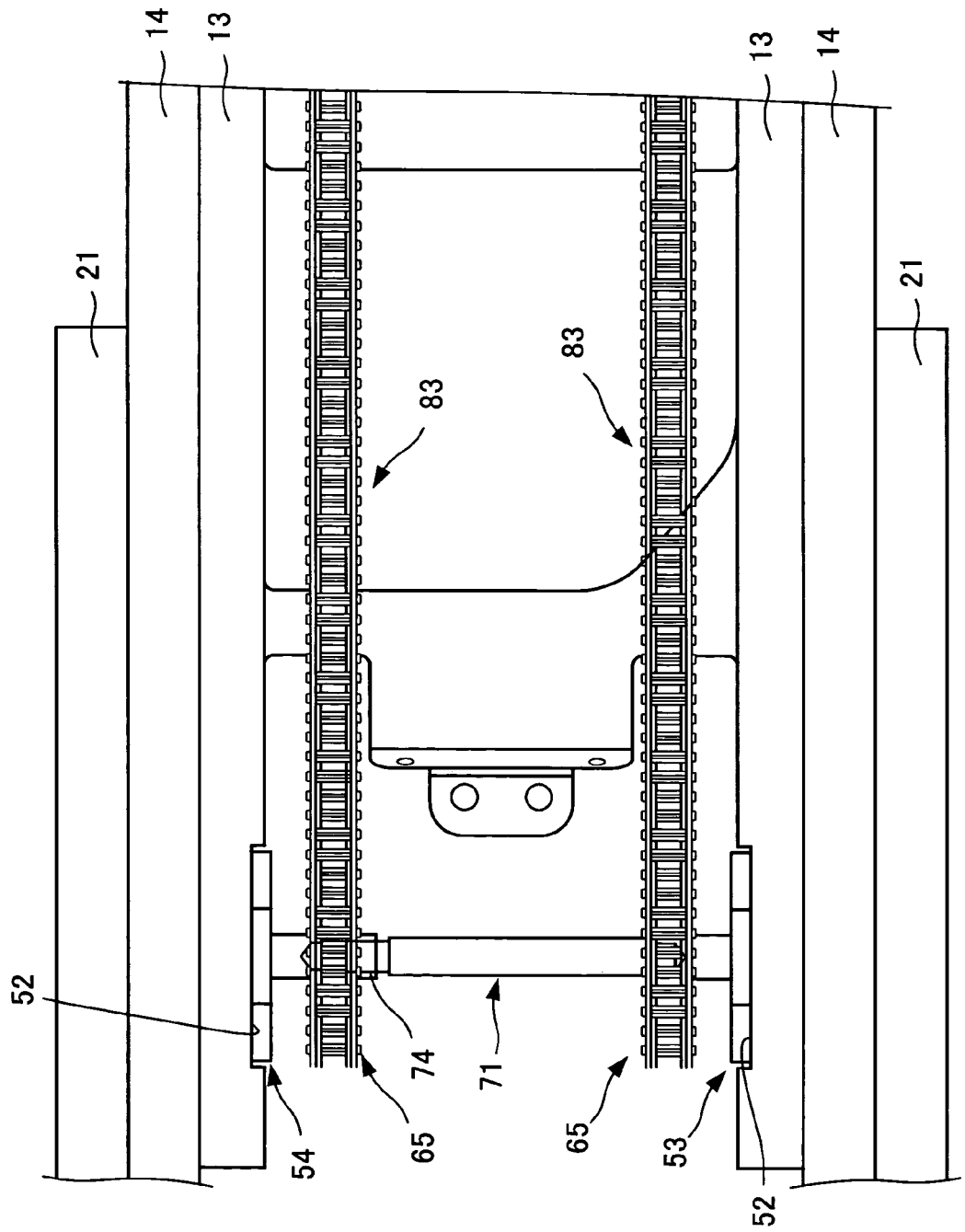
FIG. 3 is a plan view showing an essential portion of the embodiment shown in FIG. 1.

In inside faces 51, 51 in the front end portions of both the inner rails 13, 13, attachment portions 52, 52 are provided in a concave form, and first and second sprocket supporting brackets 53 and 54 are fixed to each of the attachment portions 52, 52 as shown in FIG. 3.

Figure 4:
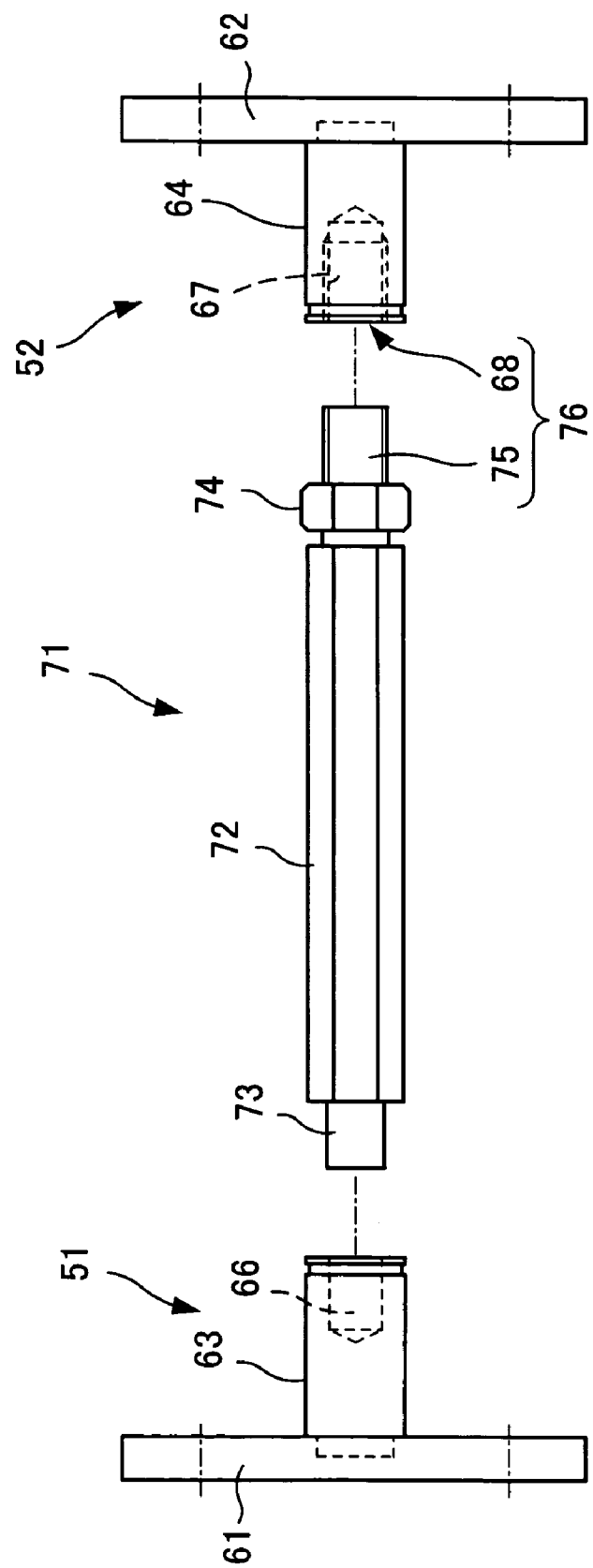
FIG. 4 is a plan view showing a portion around a stay of the embodiment shown in FIG. 1.
Figure 5:
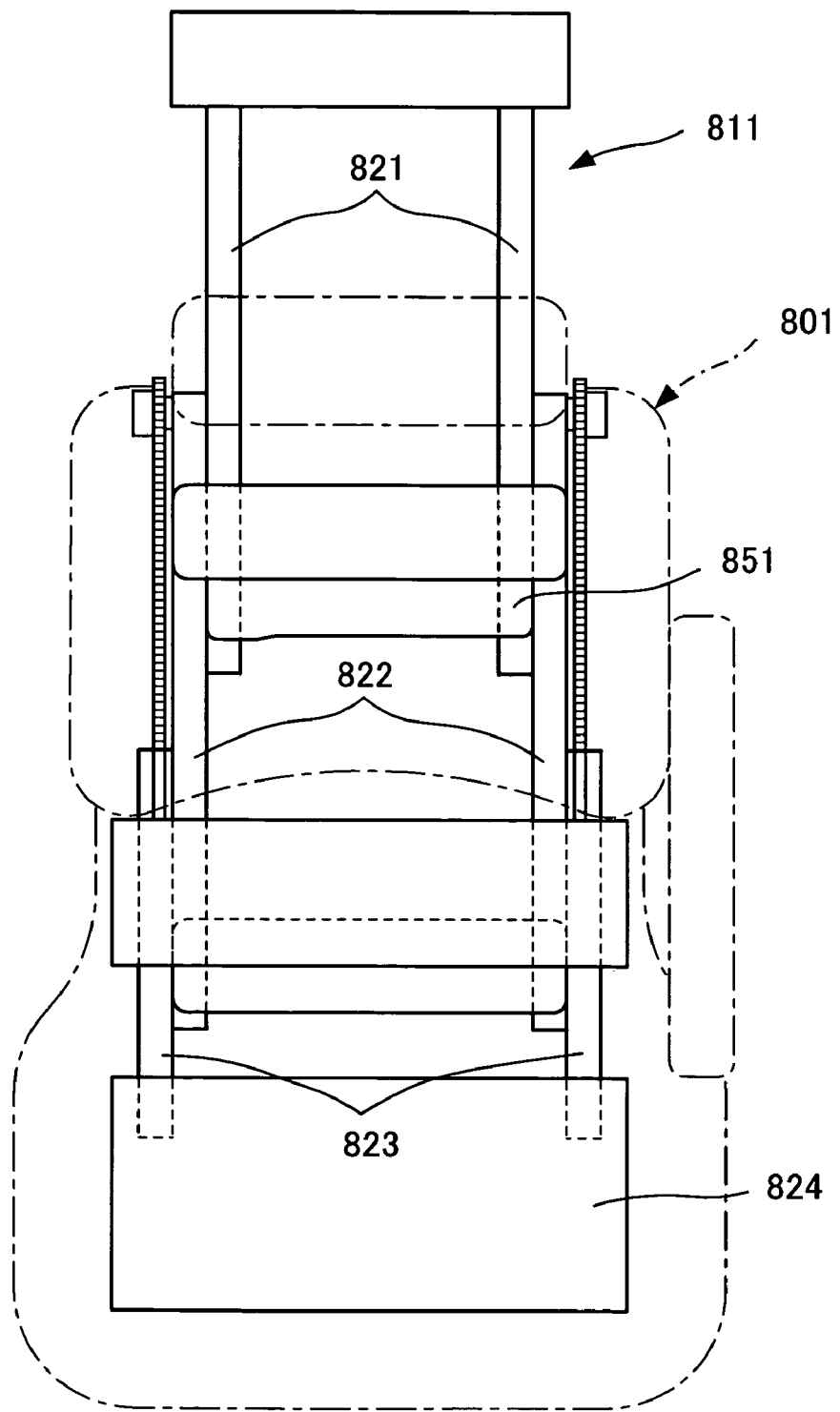
FIG. 5 is a plan view of a conventional driving unit.
Figure 6:
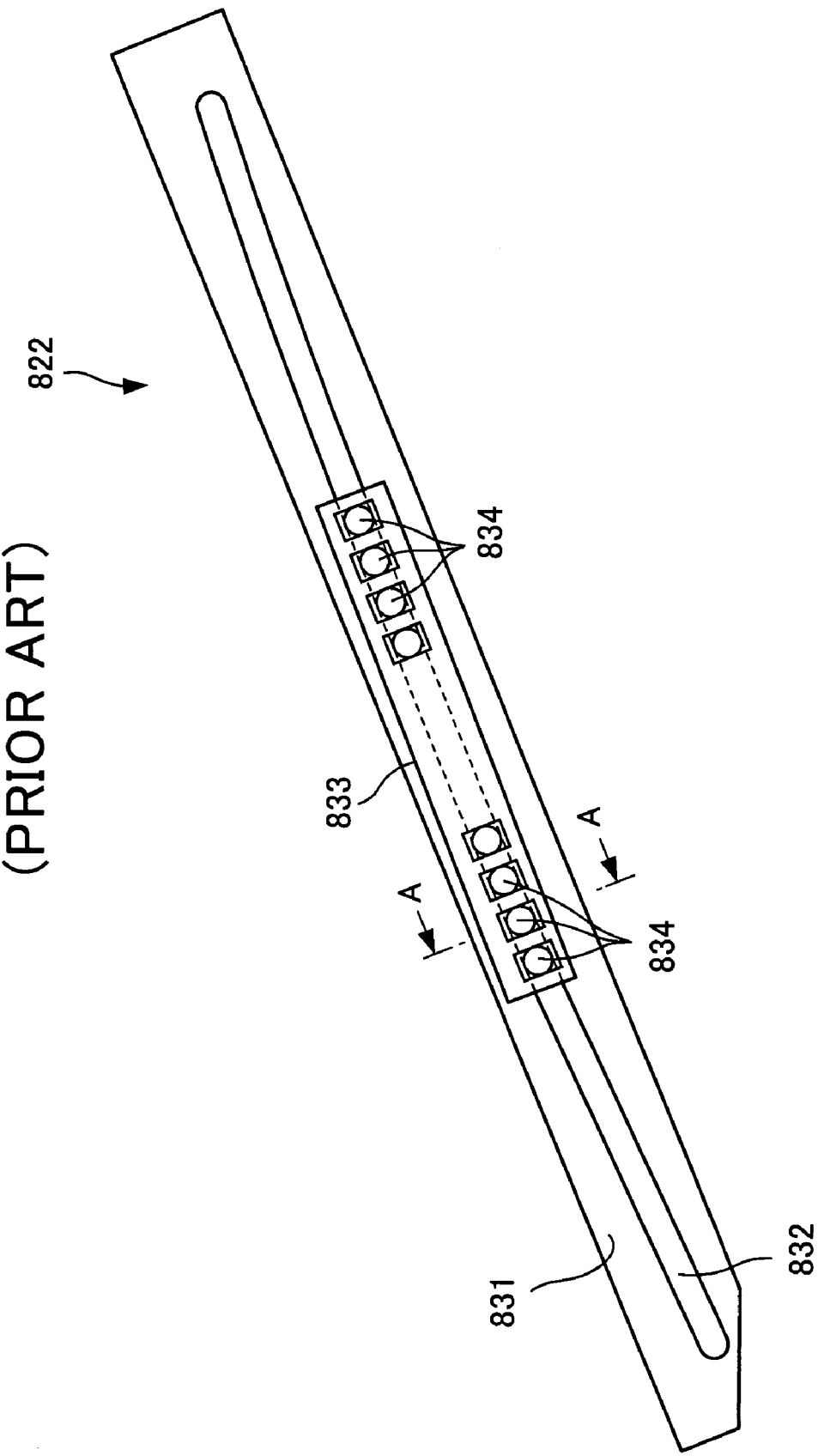
FIG. 6 is a side view of an inner rail of the conventional example shown in FIG. 5.
Figure 7:
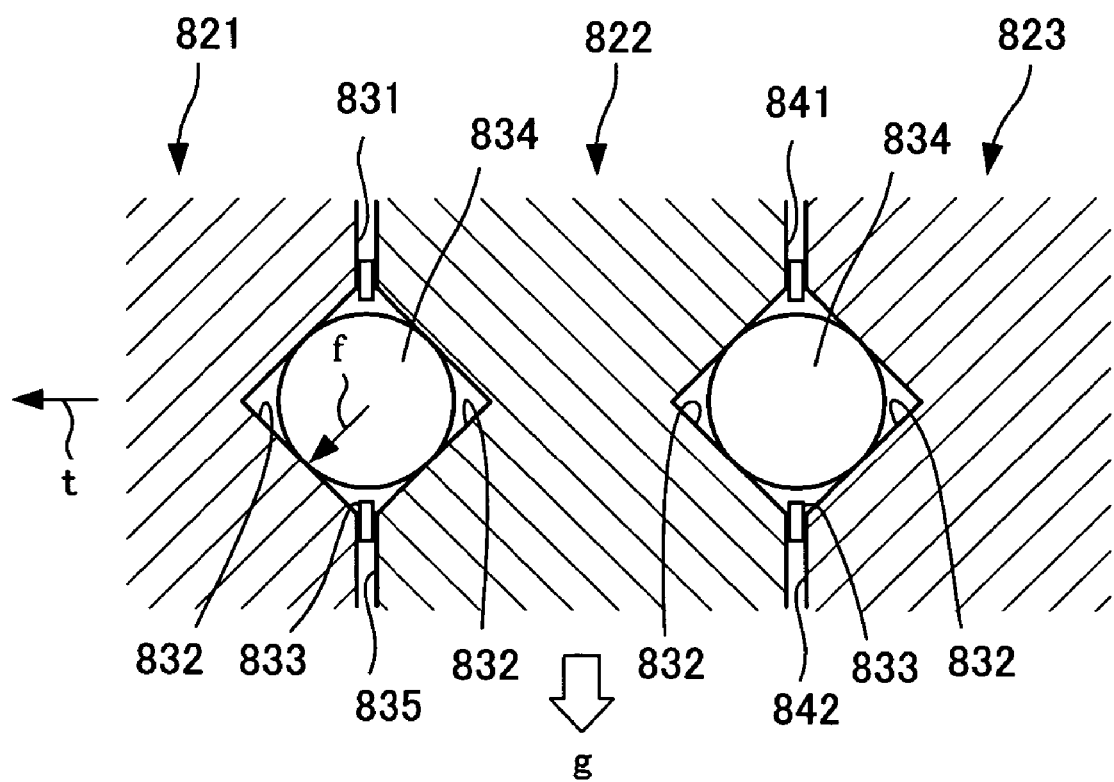
FIG. 7 is a sectional view taken along a line A—A of FIG. 6.

As shown in FIG. 4, each sprocket supporting bracket 53, 54 consists of plate-shape first and second base portions 61, 62 fixed to the attachment portions 52, 52 and first and second sprocket shafts 63, 64 extending from the base portions 61, 62, respectively, and sprockets 65, 65 are provided on both the sprocket shaft 63, 64 via a bearing so as to be rotatable as shown in FIGS. 1 and 3. As shown in FIG. 4, at the tip end of the first sprocket shaft 63 of the first sprocket supporting bracket 53, a bottomed circular hole 66 is provided, and at the tip end of the second sprocket shaft 64 of the second sprocket supporting bracket 54, a bottomed threaded hole 68 formed with thread grooves 67 in the inside face thereof is provided.

Between both the sprocket supporting brackets 53 and 54, a rod-shaped stay 71 is provided. The stay 71 is made up of a stay body 72 of a hexagonal prism shape, a cylindrical portion 73 which extends from one end of the stay body 72 and is inserted rotatably in the circular hole 66 in the first sprocket shaft 63, and an external thread portion 75 which extends from the other end of the stay body 72, with which a lock nut 74 is threadedly engaged, and the tip end portion of which is threadedly inserted in the threaded hole 68 in the second sprocket shaft 64.

Thereby, both ends of the stay 71 can be supported on the inside faces 51, 51 of both the inner rails 13, 13 via each of the sprocket supporting brackets 53, 54. Also, after the insertion allowance of the external thread portion 75 into the threaded hole 68 in the second sprocket shaft 64 is changed by turning the stay body 72 in a hexagonal prism shape with a spanner, this state can be maintained by moving the lock nut 74 toward the second sprocket shaft 64. A regulation mechanism 76 for regulating and maintaining the distance between both the inner rails 13, 13 is formed by the external thread portion 75 and the threaded hole 68.

As shown in FIG. 1, a driving unit 81 is provided at the rear of the inner rails 13, 13, and a driving chain 83 is set around a drive sprocket 82 of the driving unit 81. The driving chain 83 and the later-described each sprocket are provided in a pair on the right and left.

The driving chain 83 is provided in the rear end portion of the inner rail 13, 13, and returned by a sprocket 84 with one end thereof being fixed to the bracket 16 bridged between the rear end portions of the center rails 14, 14. The driving chain 83 is returned by the sprocket 65 provided in the front end portion of the inner rail 13, 13, and the other end thereof is fixed to the bracket 16.

Under the inner rail 13, 13, one end of a first driven chain 91 is fixed. The first driven chain 91 is returned by a sprocket 92 provided in the rear end portion of the center rail 14, 14, and the other end thereof is fixed to the bracket 22 in the rear end portions of the outer rails 21, 21. Also, under the inner rail 13, 13, one end of a second driven chain 93 is fixed. The second driven chain 93 is returned by a sprocket 94 provided in the front end portion of the center rail 14, 14, and the other end thereof is fixed to the bracket 22 in the rear end portions of the outer rails 21, 21.

Thereupon, by driving the driving chain 83 using the drive sprocket 82, the center rails 14, 14 are moved in the lengthwise direction with respect to the inner rails 13, 13, and at the same time, the outer rails 21, 21 are moved in the lengthwise direction with respect to the center rails 14, 14, whereby the seat 3 supported on the outer rails 21, 21 can be slid along the slide rail 1.

In this embodiment configured as described above, if a load from the seat 3 is applied to the center rails 14, 14 provided on the outside of the inner rails 13, 13 of the swivel upper 12, a force is applied to the inner rails 13, 13 via the steel balls 36, . . . and the V-groove 32 in the direction such that the inner rails 13, 13 are deflected toward the inside. However, the stay 71 both ends of which are supported on the inside faces 51, 51 is provided between both the inner rails 13, 13. Therefore, the deflection of both the inner rails 13, 13 toward the inside can be prevented.

Thereby, the transverse shift of the center rails 14, 14 and the outer rails 21, 21 can be prevented, and hence a trouble caused by the transverse shift, specifically, a trouble such that the seat 3 supported on the outer rails 21, 21 shifts transversely can be eliminated.

The stay 71 has a regulation mechanism 76 for regulating and maintaining the distance between both the inner rails 13, 13. By regulating the distance between both the inner rails 13, 13 in advance with a spanner, the pre-load on the steel balls 36, . . . held between the V-groove 32 in the inner rail 13, 13 and the V-groove 34 in the center rail 14, 14 can be regulated.

Thereby, looseness of both the rails 13, 13, 14, 14 can be prevented, and also the sliding motion of the center rails 14, 14 with respect to the inner rails 13, 13 can be made smoother.

Also, the stay 71 is supported on the inner rails 13, 13 via each of the sprocket shafts 63, 64 for sprockets 64, 65 around which the driving chains 83, 83 are set. Thereby, the sprocket shafts 63, 64 provided to drive the center rails 14, 14 can be utilized effectively, and also the pressure exerted on the stay 71 and the surface of the inner rail 13, 13 can be reduced.

Both ends of both the sprocket shaft 63, 64 can be supported on the inner rails 13, 13. Therefore, the support rigidity can be enhanced as compared with the case where the tip end of each of the sprocket shaft 63, 64 is opened.

As described above, according to the slide rail in accordance with the present invention as set forth above, even if a load applied to the outside rail acts in the direction such that the inside rail is deflected toward the inside, the inward deflection of both the inside rails can be prevented by the stay provided between both the inside rails.

Thereby, the transverse shift of the outside rails can be prevented, and hence a trouble caused by the transverse shift can be eliminated.

The stay is provided with a regulation mechanism for regulating and maintaining the distance between both the inside rails. Therefore, by regulating the distance between both the inside rails in advance, the pre-load on the spherical bodies held between the V-grooves can be regulated.

Thereby, looseness of the rails can be prevented, and also the sliding motion of the outside rails with respect to the inside rails can be made smoother.

Also, according to the slide rail in accordance with the present invention as set forth above, the stay is supported on the inside rails via the sprocket shafts, so that the sprocket shafts provided to drive the outside rails can be utilized effectively. Also, the pressure exerted on the stay and the surface of the inside rail can be reduced.

Since both ends of the sprocket shaft can be supported on the inside rails, the support rigidity can be enhanced as compared with the case where the tip end of the sprocket shaft is opened.

What is claimed is:

1. A slide rail assembly in which V-grooves having a V shape in cross section are formed in a lengthwise direction in outside faces of a pair of inside rails having inside faces provided so as to face each other and in the inside faces of a pair of outside rails provided on the outside of both said inside rails, and said outside rails are moved relative to said inside rails by spherical bodies provided between both said V-grooves,
   wherein there is provided a stay both ends of which are supported on the inside faces of both said inside rails, and said stay is provided with a regulation mechanism for regulating and maintaining a distance between both said inside rails, and
   wherein there is provided a sprocket for a chain for driving said outside rail on the inside face of said inside rail, and said stay is supported on said inside rails via a sprocket shaft which supports said sprocket on said inside rail.

2. The slide rail according to claim 1 wherein the mechanism for regulating and maintaining a distance includes said stay and said sprocket being threaded together to permit varying said distance by variably threading said stay and said sprocket together.

3. The slide rail according to claim 2 further comprising a means for locking a threaded state of said stay and said sprocket.

4. The slide rail according to claim 3 wherein the means for locking is a locking nut.

5. The slide rail according to claim 1 wherein the both ends of the stay are supported on the inside faces of both said inside rails substantially opposing said V-grooves of said inside rails.

6. The slide rail according to claim 2 wherein the both ends of the stay are supported on the inside faces of both said inside rails substantially opposing said V-grooves of said inside rails.

7. A slide rail assembly comprising:
   a pair of inside rails in which V-grooves having a V shape in cross section are formed in a lengthwise direction in outside faces of the pair of inside rails which have inside faces provided so as to face each other;
   V-grooves formed in inside faces of a pair of outside rails provided outside of both said inside rails, and said outside rails are moved relative to said inside rails by spherical bodies provided between both said V-grooves;
   a stay both ends of which are supported on the inside faces of both said inside rails substantially opposing said V-grooves of said inside rails, and said stay is provided with a regulation mechanism for adjusting and maintaining a distance between both said inside rails; and
   wherein the mechanism for adjusting and maintaining a distance includes said stay and a support member supporting an end of said stay on at least one of said inside rails, and said stay and said support member being threaded together to permit varying said distance by variably threading said stay and said support member together.

8. The slide rail according to claim 7 further comprising a means for locking a threaded state of said stay and said support member.

9. The slide rail according to claim 8 wherein the means for locking is a locking nut.

10. A slide rail assembly comprising:
    a pair of inside rails in which V-grooves having a V shape in cross section are formed in a lengthwise direction in outside faces of the pair of inside rails which have inside faces provided so as to face each other;
    V-grooves formed in inside faces of a pair of outside rails provided outside of both said inside rails, and said outside rails are moved relative to said inside rails by spherical bodies provided between both said V-grooves;
    a stay both ends of which are supported on the inside faces of both said inside rails substantially opposing said V-grooves of said inside rails, and said stay is provided with a regulation mechanism for adjusting and maintaining a distance between both said inside rails; and
    wherein the mechanism for regulating and maintaining a distance includes an end of said stay being threadably supported on at least one of said inside rails to permit varying said distance by variably threading said stay wit relation to said rail.

11. The slide rail according to claim 10 further comprising a means for locking a threaded state of said stay and said support member.

12. The slide rail according to claim 11 wherein the means for locking is a locking nut.

* * * * *